June 7, 1927.
E. E. HISCOX ET AL
1,631,129
AUTOMOBILE OIL DRAIN DEVICE
Filed May 11, 1926
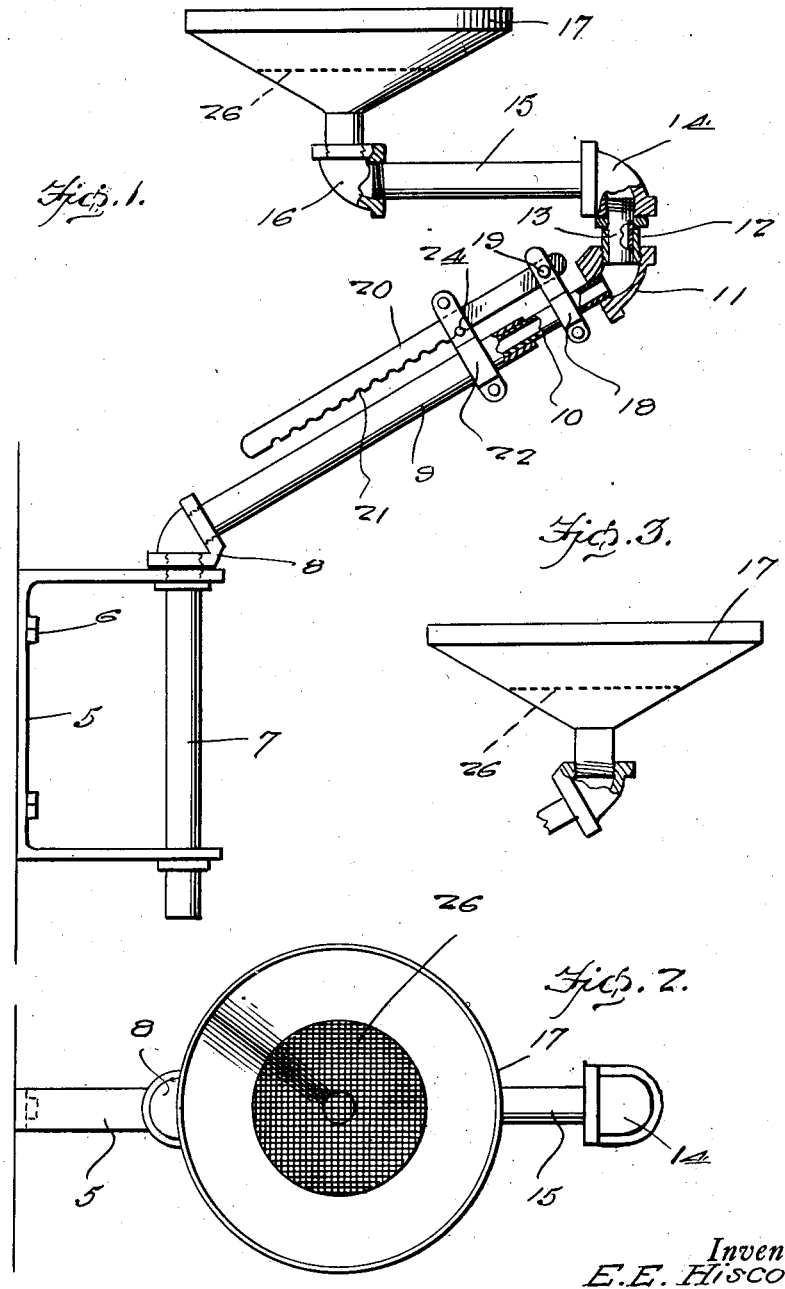
Inventors
E.E. Hiscox
C.I. Hiscox
By Clarence A O'Brien
Attorney Patented June 7, 1927.

1,631,129

UNITED STATES PATENT OFFICE.

ELMER E. HISCOX, OF CHICAGO, ILLINOIS, AND CHARLES I. HISCOX, OF LA CROSSE, WISCONSIN.

AUTOMOBILE OIL-DRAIN DEVICE.

Application filed May 11, 1926. Serial No. 108,438.

This invention relates to an oil drain device particularly useful in oil draining pits or oil draining racks such as are used about automobile service stations.

An object of the invention is to provide a device of this nature which is thoroughly adjustable so that the funnel thereof may be brought into close proximity to the drain outlet of the crank case of any make of automobile, so as to prevent the oil from being wasted.

Another very important object of the invention resides in the provision of a device of this nature including a rotatably mounted vertical pipe coupled to a slanting pipe formed in telescopically associated sections having means associated therewith so that the sections may be held in position to provide the desired length to the pipe.

Another very important object of the invention lies in the provision in a device of this nature of a vertical pipe section having telescopically associated parts one rotatable in the other, the inner one being provided with a horizontal extension on the extremity of which is disposed a funnel.

A still further very important object of the invention lies in the provision of a device of this nature with an exceedingly simple construction, one which is easy to manipulate, strong, inexpensive to manufacture, and one which is otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the contrivance embodying the features of our invention, parts being shown in section, Fig. 2 is a top plan view thereof, and Fig. 3 is a sectional elevation of the funnel and elbow associated therewith.

Referring to the drawing in detail, it will be seen that 5 designates a U-shaped bracket having the bight portion thereof disposed vertically and fixed in any suitable manner such as by fastening elements 6 to the wall of a pit or the side of a rack or to any other suitable support. A vertical pipe section 7 is rotatable in the extremities of the arms of the U-shaped bracket 5.

An elbow 8 is threadedly mounted on the upper end of the pipe section 7. A pipe section 9 is threadedly engaged in the upper end of the elbow 8 and telescopically receives therein a pipe section 10. An elbow 11 is threadedly engaged on the upper end of the inner pipe section 10. A pipe section 12 threadedly engages with the upper end of the elbow 11. A pipe section 13 is rotatable in the pipe section 12 and threadedly engaged with the lower end of an elbow 14 to the upper end of which is threadedly engaged a pipe section 15 horizontally disposed.

An elbow 16 is threadedly engaged on the other end of the pipe section 15 and threadedly receives a funnel 17.

A clamp 18 is mounted on the pipe section 10 and has pivotally engaged therewith as at 19 a rod 20 having a plurality of notches 21. A clamp 22 is engaged on the pipe section 9 and receives between the ends thereof the rod 20. A pin 24 is disposed in the clamp 22 being engaged by the notches 21 so as to allow the pipe sections 9 and 10 to be extended in relation to each other if such is desired.

From the above description in detail, it will be seen that this contrivance provides a plurality of desirable adjustments useful in drain pits or drain racks for draining the oil from automobile crank cases. By using this device, the draining of the automobile crank cases may be accomplished rapidly and without loss of oil. The device may be made of iron pipe, which is adjustable by use of the swivel joint formed at 12, 13, and by the sliding of pipe 10 in pipe section 9.

The device is thus adjustable vertically as well as horizontally and longitudinally. The device is adjustable vertically and longitudinally in one operation, by the use of the rod 20. The device has a large swinging radius which eliminates the necessity of the automobile being placed in any particular position. The funnel is provided with a strainer 26 which prevents any foreign substance entering the oil that has been drained. With all of these adjustments, it will be seen that the funnel can be so adjusted to fit close to part of automobiles being drained, thus preventing the wind from blowing the oil over the place, as often happens under the present practice.

The present embodiment of the invention has been disclosed in detail, merely by way of example, since in actual practice it attains the features of advantage enumerated as desirable in the statement of the invention and the above description. Numerous changes in the details of construction, and in the combination and arrangement of parts may be resorted to without departing from the spirit or scope of the invention as hereinafter claimed, or sacrificing any of its advantages.

Attention is directed to the fact that the coupling 14 may be removed from the member 13 so that the funnel 17 may be engaged in the member 13 rather than in the member 16 if desired.

Having thus described our invention, what we claim as new is:—

1. A device of the class described including a funnel, a pipe leading from the funnel, a second pipe, a swivel joint between the first and second pipes, a third pipe telescoped over the second pipe, and a fourth pipe engaged with the third pipe, and means for rotatably mounting the fourth pipe.

2. A device of the class described including a funnel, a pipe leading from the funnel, a second pipe, a swivel joint between the first and second pipes, a third pipe telescoped over the second pipe, a fourth pipe engaged with the third pipe, means for rotatably mounting the fourth pipe, and means for holding the second and third pipes in adjusted positions in relation to each other.

3. A device of the class described including a funnel, a pipe leading from the funnel, a second pipe, a swivel joint between the first and second pipes, a third pipe telescoped over the second pipe, a fourth pipe engaged with the third pipe, means for rotatably mounting the fourth pipe, means for holding the second and third pipes in adjusted positions in relation to each other, said means including a clamp attached to one of the telescopically associated pipes, and a clamp attached to the other of the telescopically associated pipes, a rod pivoted on one of the clamps, a pin in the other clamp, said rod having teeth engageable with said pin.

In testimony whereof we affix our signatures.

ELMER E. HISCOX.
CHARLES I. HISCOX.